S. SNELL.
Animal-Trap.

No. 204,102. Patented May 21, 1878.

WITNESSES:
J. P. Hollingsworth.
Edw. W. Byrn.

INVENTOR:
Sylvester Snell
BY
ATTORNEYS.

UNITED STATES PATENT OFFICE.

SYLVESTER SNELL, OF WATERTOWN, NEW YORK.

IMPROVEMENT IN ANIMAL-TRAPS.

Specification forming part of Letters Patent No. 204,102, dated May 21, 1878; application filed March 20, 1878.

*To all whom it may concern:*

Be it known that I, SYLVESTER SNELL, of Watertown, in the county of Jefferson and State of New York, have invented a new and Improved Animal-Trap; and I do hereby declare that the following is a full, clear, and exact description of the same, reference being had to the accompanying drawing, forming part of this specification, in which—

Figure 1:
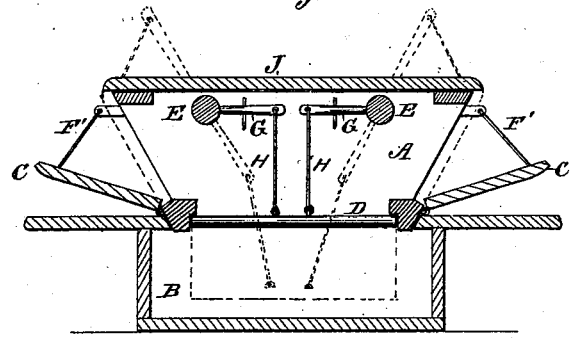
Figure 2:
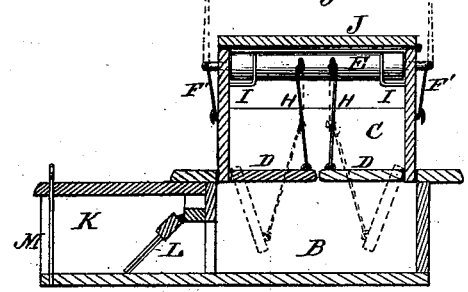
Figure 3:
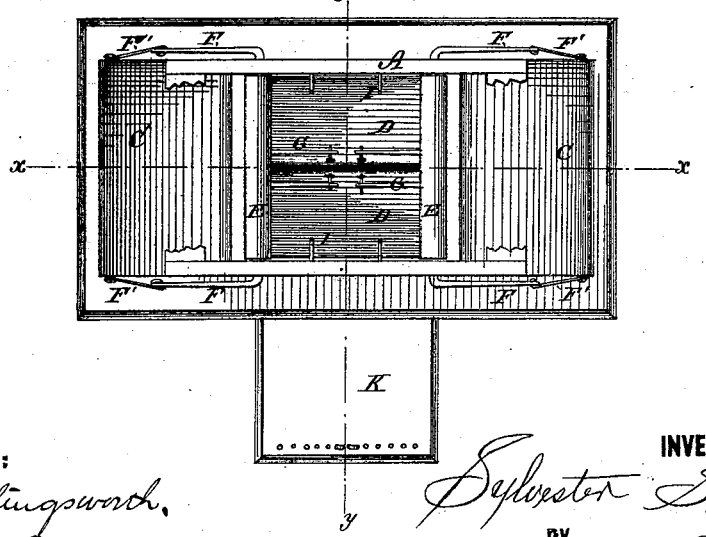

Figure 1 is a vertical longitudinal section through the line $x\ x$ of Fig. 3. Fig. 2 is a vertical transverse section through the line $y\ y$ of Fig. 3; and Fig. 3 is a plan view with the top of the trap removed.

My invention is an improvement upon that general form of animal-trap in which the weight of the animal upon a tilting platform is made to close the doors of the cage and shut off escape.

The improvement consists, chiefly, in hinging the doors of the cage at the bottom and in an inclined position, and combining them, through rock-shafts and arms, with two falling doors closing to form a platform in the middle and in a line at right angles to the outer doors, whereby the end and bottom doors are made to counterbalance each other, and the weight of the animal's forefeet serves, by operating through the rock-shafts and arms upon the outer end doors, to toss his hind parts in and completely precipitate him into a pit below.

In the drawing, A is the body of the trap, arranged removably above a pit, B, which latter, however, may be a receptacle containing water.

C are the end doors, hinged at the bottom and folding outwardly and downwardly, and closing upwardly against the projecting and inclined ends of the box.

D are the bottom doors, hinged upon the sides and folding downwardly to give access to the pit below and closing upon each side into a horizontal position over the same.

E are shafts, journaled transversely in the sides of the box, and provided with horizontal crank-arms F upon the outside of the box, which connect through rods F' with the end doors C, and provided also with horizontal arms G connected by vertical rods H with the doors D.

The doors C and D, it will be seen, are connected with each other through the rods, crank-arms, and rock-shaft, so that their weights shall operate against each other, the end doors C being arranged, however, to overbalance the doors D, so as to keep the latter normally closed.

I are hooks in the sides of the box, upon which the bait is hung, and to which access is gained by removing the hinged top J, secured by a hook or other suitable fastening.

As the animal approaches the bait the pressure of his forefeet upon the doors D causes the latter to descend, and the same movement is made to lift the door C and toss his hind parts in, precipitating him headlong, and without possibility of recovery, into the pit or receptacle for water below.

This coaction of the end and bottom doors, it will be seen, is effected by hinging the end doors about in the same plane and at right angles to the bottom doors, this arrangment serving to bring the doors sufficiently close to make them co-operate to effectually dump the animal into the pit.

The end doors C, being inclined outwardly at the top when closed, fall outwardly again when the animal has dropped into the pit, and thus the trap is rendered self-setting.

In connection with the pit B a removable cage, K, may be arranged, having a gravitating hinged door, L, covering an inlet opening from the pit, which door the animal will lift and pass under upon seeing the light through the bars M of this cage, thus freeing the trap from his presence and permitting him to be captured alive.

In constructing the trap it may be made either of sheet metal, wood, or wire, or of these materials combined, and one of the end doors may be dispensed with.

Having thus described my invention, what I claim as new is—

1. The combination, with the case or box A, of one or more end doors, C, hinged at the bottom and arranged to fold outwardly, and the falling doors D D, hinged at right angles to the end doors and arranged to fold inwardly to a central line, and connected with the end doors for reverse movement, substantially as described.

2. The combination, with the pit B and removable cage K, having door L, of the removable box A, having doors C and D connected by shafts, rock-arms, and rods, substantially as described.

SYLVESTER SNELL.

Witnesses:
IRA FISK,
IRA J. FREEMAN.